(12) United States Patent
Chae et al.

(10) Patent No.: US 11,868,881 B2
(45) Date of Patent: Jan. 9, 2024

(54) ARTIFICIAL INTELLIGENCE LAUNDRY DRYING MACHINE

(71) Applicant: LG ELECTRONICS INC., Seoul (KR)

(72) Inventors: Jonghoon Chae, Seoul (KR); Esther Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 750 days.

(21) Appl. No.: 16/570,998

(22) Filed: Sep. 13, 2019

(65) Prior Publication Data

US 2020/0002873 A1 Jan. 2, 2020

(30) Foreign Application Priority Data

Aug. 9, 2019 (KR) .................. 10-2019-0097616

(51) Int. Cl.
*G06N 3/08* (2023.01)
*D06F 29/00* (2006.01)
(Continued)

(52) U.S. Cl.
CPC ............. *G06N 3/08* (2013.01); *D06F 29/005* (2013.01); *D06F 58/38* (2020.02); *G06N 20/00* (2019.01); *D06F 2101/00* (2020.02); *D06F 2101/20* (2020.02); *D06F 2103/00* (2020.02); *D06F 2103/04* (2020.02); *D06F 2103/06* (2020.02); *D06F 2103/08* (2020.02); *D06F 2103/16* (2020.02); *D06F 2103/32* (2020.02); *D06F 2105/12* (2020.02); *D06F 2105/20* (2020.02);
(Continued)

(58) Field of Classification Search
CPC ........ G06N 3/08; G06N 20/00; D06F 29/005; D06F 58/38; D06F 2101/00; D06F 2101/20; D06F 2103/00; D06F 2103/04; D06F 2103/06; D06F 2103/08; D06F 2103/16; D06F 2103/32; D06F 2105/12; D06F 2105/20; D06F 2105/54; D06F 2105/56; D06F 2105/58; D06F 2105/60
See application file for complete search history.

(56) References Cited

U.S. PATENT DOCUMENTS 5,899,005 A * 5/1999 Chen ................... D06F 58/38
34/535
2017/0183811 A1* 6/2017 Kang .................. D06F 34/05

FOREIGN PATENT DOCUMENTS

KR 1020050066534 6/2005
KR 1020170076397 7/2017
KR 20180038332 A * 4/2018

OTHER PUBLICATIONS

Korean Intellectual Property Office Application No. 10-2019-0097616, Office Action dated Jul. 27, 2020, 5 pages.

* cited by examiner

*Primary Examiner* — Michael E Barr
*Assistant Examiner* — Pallavi Chitta
(74) *Attorney, Agent, or Firm* — LEE, HONG, DEGERMAN, KANG & WAIMEY

(57) ABSTRACT

An artificial intelligence laundry drying machine is provided. The artificial intelligence laundry drying machine includes a communication unit configured to receive washing information of a washing machine from the washing machine, a drying unit configured to dry a drying object, and a processor configured to acquire information about a dryness degree of the drying object by using the washing information and perform drying by using the information about the dryness degree.

6 Claims, 8 Drawing Sheets

(51) Int. Cl.
  *G06N 20/00*  (2019.01)
  *D06F 58/38*  (2020.01)
  *D06F 103/00*  (2020.01)
  *D06F 103/04*  (2020.01)
  *D06F 103/06*  (2020.01)
  *D06F 103/08*  (2020.01)
  *D06F 103/16*  (2020.01)
  *D06F 103/32*  (2020.01)
  *D06F 105/12*  (2020.01)
  *D06F 105/20*  (2020.01)
  *D06F 105/54*  (2020.01)
  *D06F 105/56*  (2020.01)
  *D06F 105/58*  (2020.01)
  *D06F 105/60*  (2020.01)
  *D06F 101/00*  (2020.01)
  *D06F 101/20*  (2020.01)

(52) U.S. Cl.
  CPC ...... *D06F 2105/54* (2020.02); *D06F 2105/56* (2020.02); *D06F 2105/58* (2020.02); *D06F 2105/60* (2020.02)

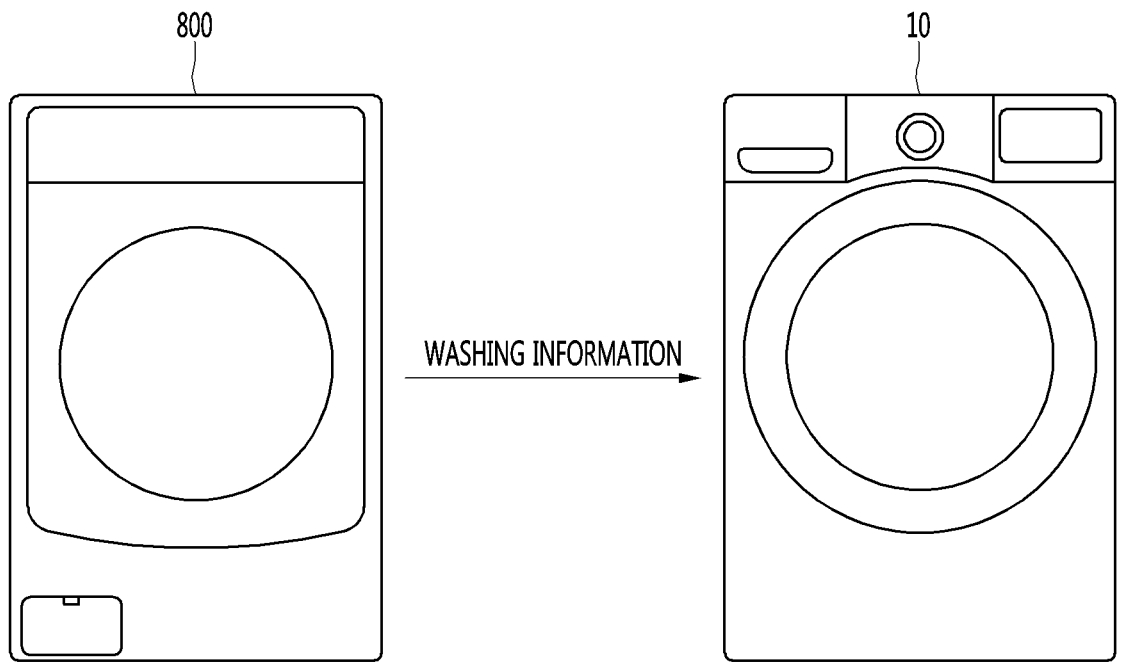

| DRYNESS DEGREE | DRYING STRENGTH |
|---|---|
| 30% | MIDDLE/90 MINUTES |

| DRYNESS DEGREE | DRYING MODE | DRYING STRENGTH |
|---|---|---|
| 30% | WOOL DRYING | MIDDLE/90 MINUTES |
| 15% | DUVET DRYING | STRONG/120 MINUTES |

FIG. 13

| DRYNESS DEGREE | DRYING MODE | DRYING OBJECT LOADING RATIO | DRYING STRENGTH |
|---|---|---|---|
| 30% | WOOL DRYING | 40% | MIDDLE/90 MINUTES |
| 15% | DUVET DRYING | 93% | STRONG/120 MINUTES |

FIG. 14

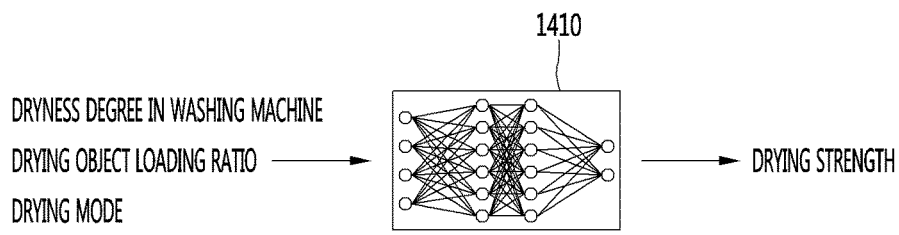

DRYNESS DEGREE IN WASHING MACHINE
DRYING OBJECT LOADING RATIO → 1410 → DRYING STRENGTH
DRYING MODE

FIG. 15

| TYPE OF LAUNDRY | LAUNDRY WEIGHT BEFORE WASHING | WATER TEMPERATURE | DEHYDRATION INFORMATION | DRYING INFORMATION | LAUNDRY LOADING RATIO | LAUNDRY WEIGHT AFTER WASHING | DRYING OBJECT LOADING RATIO | DRYING STRENGTH |
|---|---|---|---|---|---|---|---|---|
| WOOL | 3Kg | 40°C | STRONG | MIDDLE | 30% | 3.5Kg | 30% | MIDDLE/90 MINUTES |
| DUVET | 8Kg | 70°C | STRONG | STRONG | 80% | 9.5Kg | 93% | STRONG/120 MINUTES |
|  |  |  |  |  |  |  |  |  |
|  |  |  |  |  |  |  |  |  |

ARTIFICIAL INTELLIGENCE LAUNDRY DRYING MACHINE

CROSS-REFERENCE TO RELATED APPLICATIONS

Pursuant to 35 U.S.C. § 119(a), this application claims the benefit of earlier filing date and right of priority to Korean Patent Application No. 10-2019-0097616, filed on Aug. 9, 2019, the contents of which are hereby incorporated by reference herein in its entirety.

BACKGROUND

The present invention relates to a laundry drying machine capable of setting a drying strength by using washing information collected in a washing machine.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, artificial intelligence is directly or indirectly associated with the other field of computer engineering without being individually provided. Particularly, at present, in various fields of information technology, an attempt to introduce artificial intelligence components and use the artificial intelligence components in solving a problem of a corresponding field is being actively done.

Meanwhile, techniques for perceiving and learning the surrounding situation by using artificial intelligence and providing information desired by the user in a desired form, or performing an operation or function desired by the user are being actively studied.

Meanwhile, a laundry drying machine is a kind of laundry treatment apparatus that supplies high-temperature hot air into a drying drum while the drying drum in which the laundry is loaded is rotated in one direction or in both directions, thereby drying wet laundry.

In general, any one of a gas combustion method, an electric heater method, or a heat pump cycle method may be employed to generate high-temperature hot air to be supplied into the drying drum.

In particular, an electric heater type drying machine is provided with an air flow path through which air flows, and an electric heater for generating hot air is mounted at any point of the air flow path. When the drying is started, the electric heater is driven, and air introduced into the drying drum is heated to a high temperature by heat emitted from the electric heater.

Meanwhile, setting the drying strength (drying time) too strongly may cause damage to the fabric. Therefore, it is necessary to set the optimum drying strength that can dry the drying object while minimizing the damage to the cloth.

However, in the case of a conventional drying machine, since a person directly sets a drying strength, an optimal drying strength cannot be set.

SUMMARY

The present invention has been made in an effort to solve the above problems, and is directed to provide a drying machine capable of setting a drying strength by using washing information collected in a washing machine.

In one embodiment of the present invention, an artificial intelligence laundry drying machine includes: a communication unit configured to receive washing information of a washing machine from the washing machine; a drying unit configured to dry a drying object; and a processor configured to acquire information about a dryness degree of the drying object by using the washing information and perform drying by using the information about the dryness degree.

The details of one or more embodiments are set forth in the accompanying drawings and the description below. Other features will be apparent from the description and drawings, and from the claims.

BRIEF DESCRIPTION OF THE DRAWINGS

FIGS. 8 and 9 are diagrams for describing washing information according to an embodiment of the present invention.

FIG. 13 is a diagram for describing a method for setting a drying strength by using a drying object loading ratio according to an embodiment of the present disclosure.

FIG. 14 is a diagram for describing a method for acquiring a drying strength of a drying object by using a second AI model according to an embodiment of the present invention.

FIG. 15 is a diagram for describing a method for acquiring a drying strength of a drying object by using a third AI model according to an embodiment of the present invention.

DETAILED DESCRIPTION OF THE EMBODIMENTS

Figure 1:
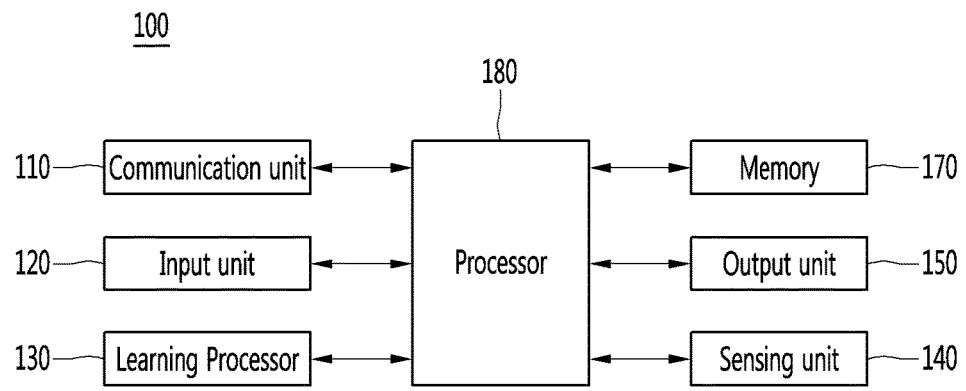
FIG. 1 illustrates an AI device 100 according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback about the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
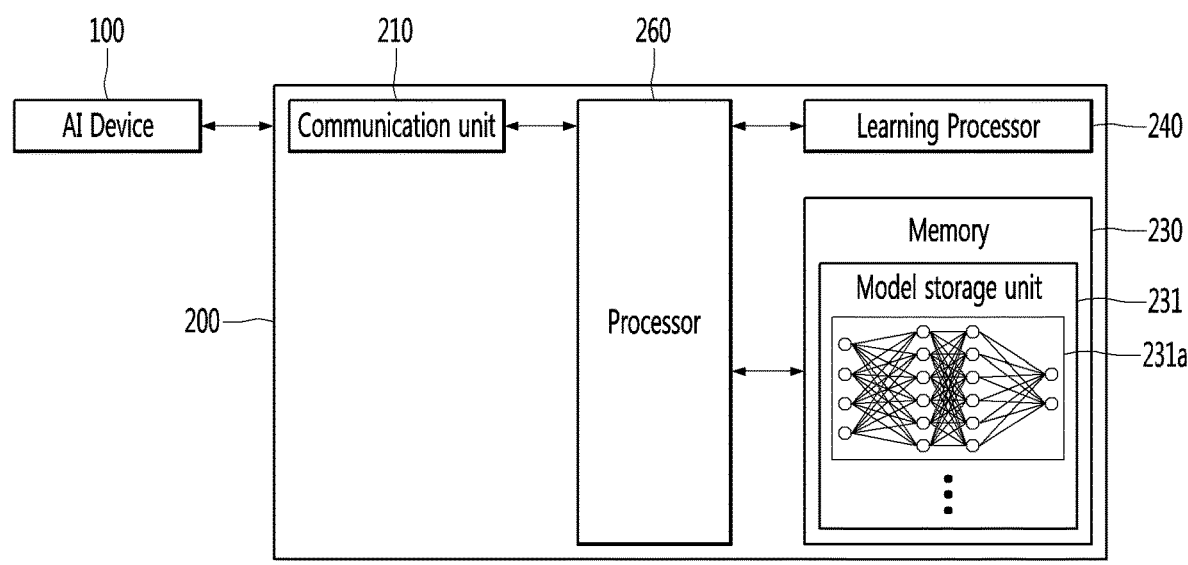
FIG. 2 illustrates an AI server 200 according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
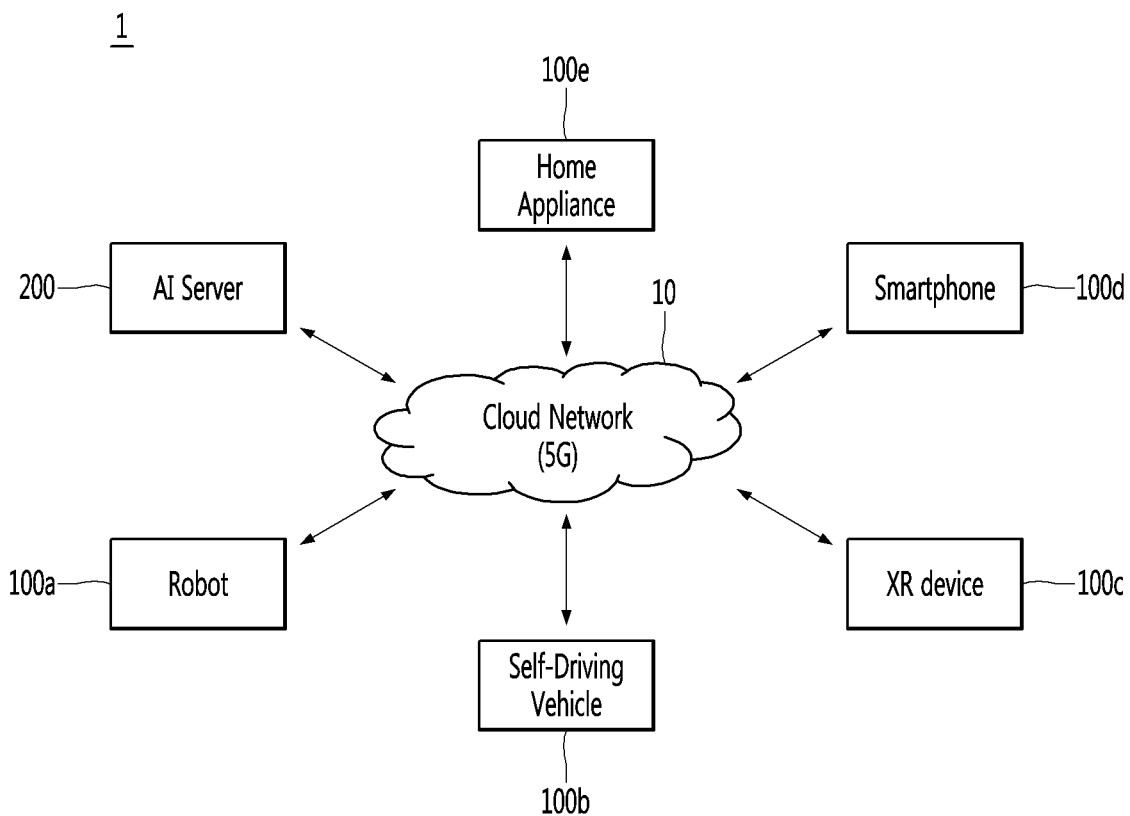
FIG. 3 illustrates an AI system 1 according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
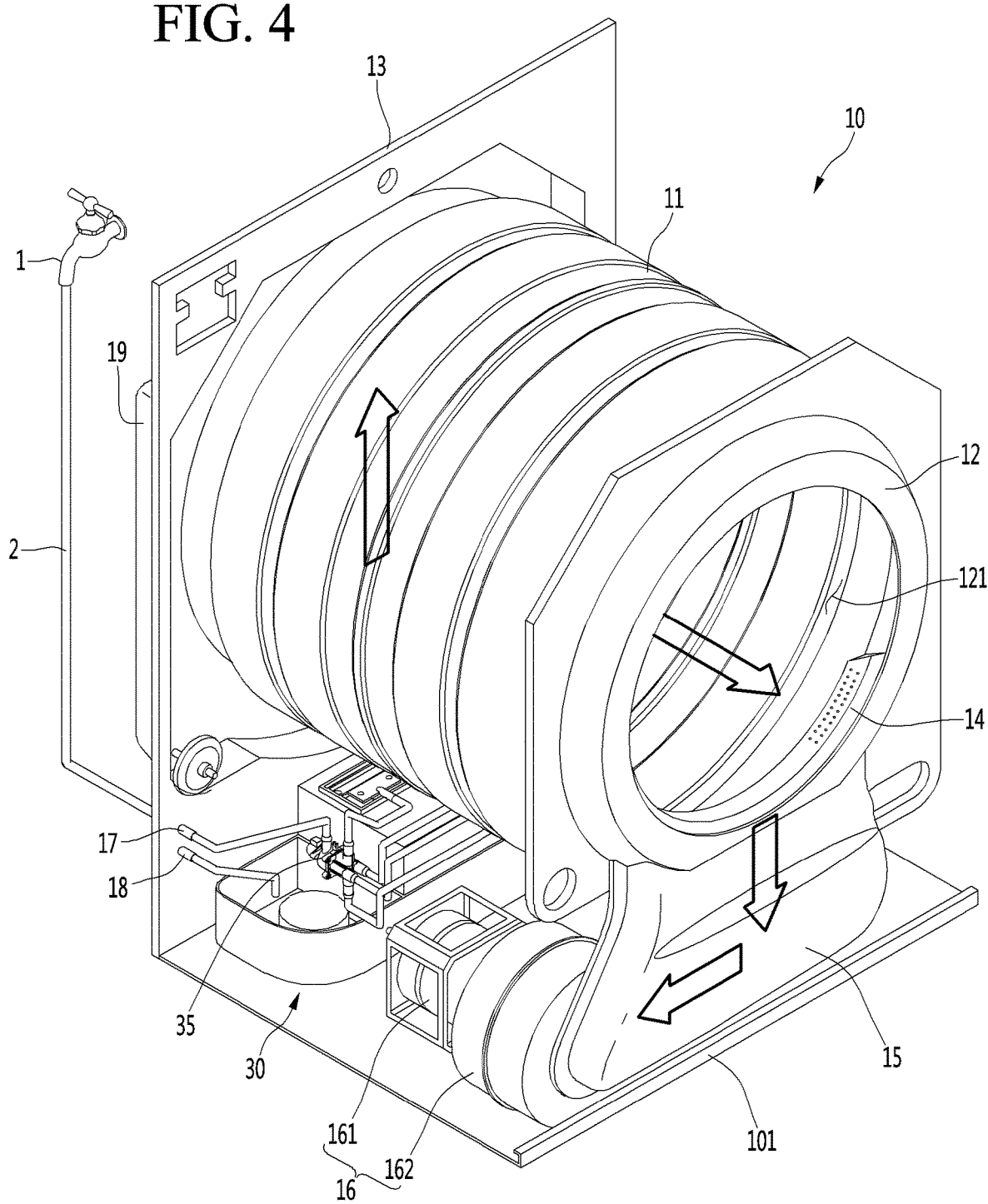
FIG. 4 is a perspective view of a laundry drying machine according to an embodiment of the present invention.

FIG. 4 is a perspective view of a drying machine according to an embodiment of the present invention.

Figure 5:
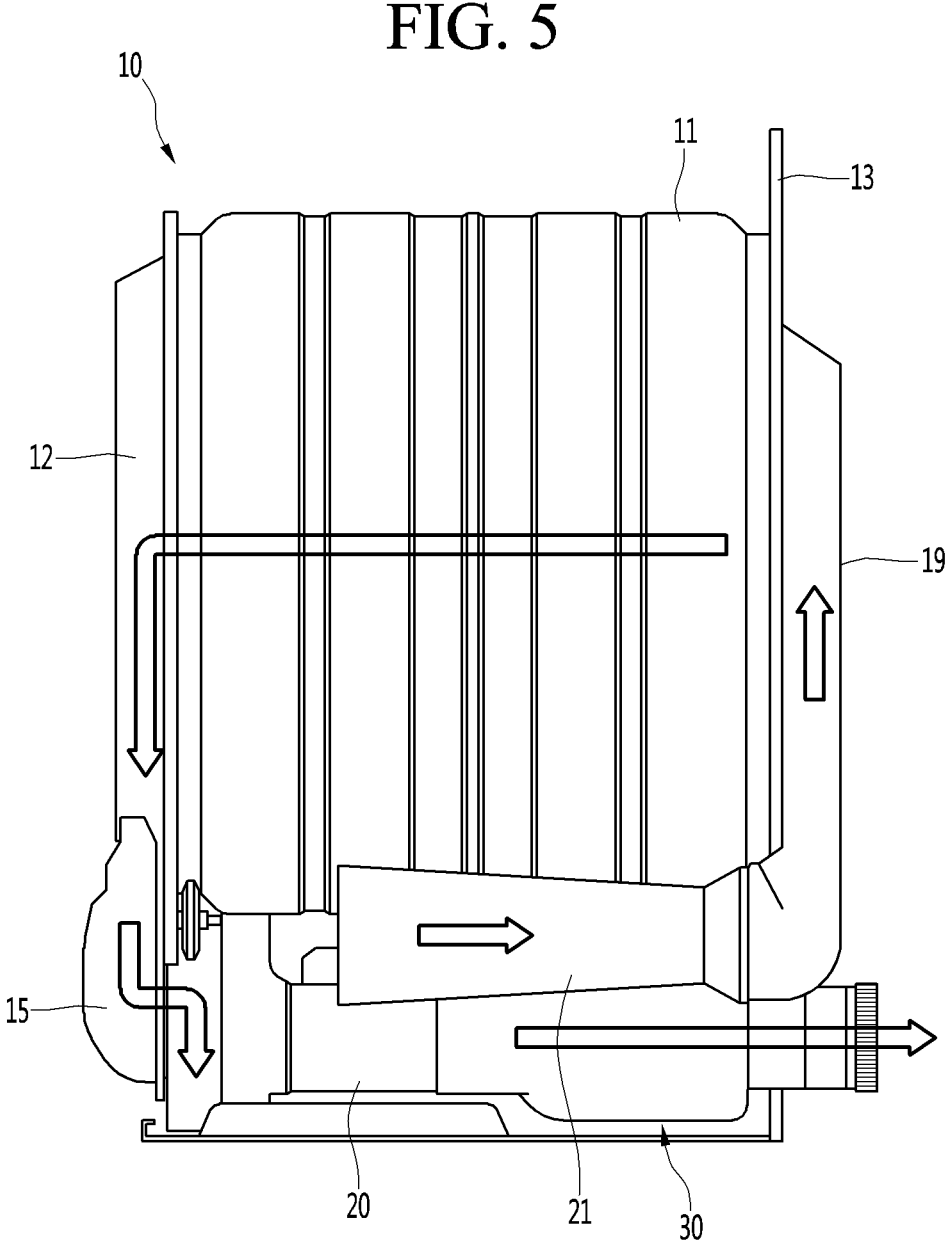
FIG. 5 is a side view of a laundry drying machine according to an embodiment of the present invention.

FIG. 5 is a side view of the laundry drying machine according to an embodiment of the present invention.

Figure 6:
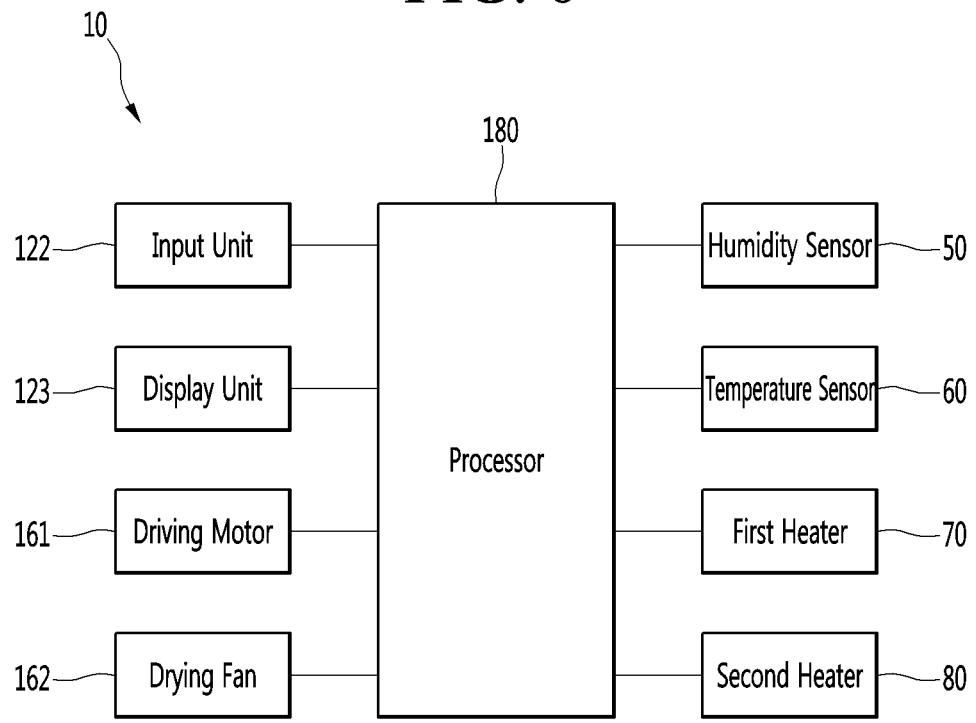
FIG. 6 is a block diagram for describing a configuration of a laundry drying machine according to an embodiment of the present invention.

FIG. 6 is a block diagram for describing a configuration of the laundry drying machine according to an embodiment of the present invention.

Referring to FIGS. 4 to 6, the laundry drying machine 10 may include a drying drum 11 into which a drying object is introduced, a humidity sensor 50 mounted on the inner circumferential surface of the drying drum 11, a front cabinet 12 supporting the front portion of the drying drum 11, a blocking member 14 mounted to the bottom of the front cabinet 12, a rear cabinet 13 supporting the rear portion of the drying drum 11, and a lint filter cleaner 30 provided below the drying drum 11.

In detail, the humidity sensor 50 may be disposed in the drying drum 11 to detect the humidity of the drying drum 11.

In addition, the laundry drying machine 10 may further include a suction duct 21 suctioning air to be supplied to the drying drum 11, a rear duct 19 connecting the suction duct 21 and an air inlet hole formed on the rear surface of the suction duct 21, a guide duct 15 connected to the bottom of the front cabinet 12 to guide the air discharged from the drying drum 11, an air blower 16 connected to the outlet end of the guide duct 15, and an exhaust duct 20 connected to the outlet end of the air blower 16. The lint filter cleaner 30 is mounted at any point of the exhaust duct 20, such that lint included in the air flowing along the exhaust duct 20 is filtered while passing through a lint filter assembly provided in the lint filter cleaner 30.

Meanwhile, a middle cabinet (not shown) is provided between the front cabinet 12 and the rear cabinet 13 to cover and protect the drying drum 11 and various parts disposed below the drying drum 11. The middle cabinet may define both side surfaces and an upper surface of the laundry drying machine 10. A base plate 101 defining the bottom of the laundry drying machine 10 may be provided below the middle cabinet, and the components may be mounted on the base plate 101.

In addition, a control panel (not shown) may be mounted on the front upper side of the front cabinet 12. The control panel may include an input unit 122 configured to select an operation mode (e.g., a drying mode) of the laundry drying machine 10, and a display unit 123 configured to display a variety of information including an operation state.

In addition, a temperature sensor 60 may be mounted on the outlet side of the drying drum 11. The temperature sensor 60 is mounted on the outlet side of the drying drum 11 and senses an outlet temperature value of the drying drum 11 (hereinafter, referred to as a "drum outlet temperature value").

For example, the temperature sensor 60 may be mounted on the inner circumferential surface of the front end side of the drying drum 11 and may be mounted on one side of the inner circumferential surface of the guide duct 15 connected to the outlet side of the drying drum 11.

In addition, the blocking member 14 is provided so as to prevent bulky and hard foreign substances, such as coins and ballpoint pens, which are included in the drying object during the drying process, from being suctioned into the guide duct 15. Foreign substances, such as lint, are filtered in the lint filter assembly mounted on the lint filter cleaner 30 even if introduced into the guide duct 15. Other foreign substances, i.e., bulky and hard foreign substances, are blocked by the blocking member 14 and remain in the drying drum 11. If substances other than lint are suctioned into the guide duct 15, the air blower 16 may be damaged or may generate a whisper in the exhaust duct 20. Therefore, it is necessary to prevent the foreign substances from leaving the drying drum 11 by the blocking member 14. In addition, the blocking member 14 may be detachably coupled to the front cabinet 12.

In addition, the lint filter cleaner 30 is connected to a washing water supply pipe 17 and a washing water drain pipe 18. The inlet end of the washing water supply pipe 17 may be mounted on the rear cabinet 13 and connected to a water pipe 2 connected from an external water supply source 1. The outlet end of the washing water supply pipe 17 is connected to an inlet port of a control valve 35 of the lint filter cleaner 30. The inlet end of the washing water drain pipe 18 is connected to a drain pump assembly (not shown) of the lint filter cleaner 30.

In addition, the air blower 16 includes a driving motor 161 rotating the drying drum 11, and a drying fan 162 connected to a rotational shaft of the driving motor 161.

The drying fan 162 is disposed at the outlet end side of the guide duct 15 to guide the air guided to the guide duct 15 through the drying drum 11 to the exhaust duct 20. The drying drum 11 is rotated by a pulley (not shown) connected to the rotational shaft of the driving motor 161 and a belt wound around the pulley and the outer circumferential surface of the drying drum 11. That is, if the driving motor 161 rotates, the pulley rotates, and when the pulley rotates, the belt rotates the drying drum 11. With this structure, if the driving motor 161 is operated, the drying drum 11 and the drying fan 162 rotate in the same direction.

In addition, an electric heater is mounted inside the rear duct 19 of the laundry drying machine 10. The electric heater generates hot air by heating air to a high temperature before the air flowing into the suction duct 21 is introduced into the drying drum 11.

The drying process of the laundry drying machine 10 having the above configuration will be briefly described. First, the drying object is introduced into the drying drum 11 through an input hole 121 provided in the front cabinet 12. If a drying start command is input through the input unit 122, the air blower 16 is operated, and the drying drum 11 and the drying fan 162 rotate in one direction. The air flowing into the suction duct 21 is heated to a high temperature by the electric heater while flowing along the rear duct 19. The air heated to a high temperature is introduced into the drying drum 11 through the rear surface of the drying drum 11 along the rear duct 19. At this time, the high-temperature dry air introduced into the drying drum 11 is changed to a high-temperature humid state while drying the drying object.

The high-temperature humid air is guided to the guide duct 15 through the blocking member 14 in a state of including lint generated from the drying object. The high-temperature humid air guided to the guide duct 15 is guided to the exhaust duct 20 by the air blower 16. At this time, the high-temperature humid air guided to the exhaust duct 20 filters lint by the lint filter assembly while passing through the lint filter cleaner 30. The lint filter cleaner 30 is operated to remove the lint attached to the lint filter assembly and discharge the lint to the outside by the drain pump assembly together with the washing water.

The processor 180 may control the overall operation of the laundry drying machine, Meanwhile, the laundry drying machine 10 according to the embodiment of the present invention may include the configuration of the terminal 100 described with reference to FIG. 1 and may perform the function of the terminal 100 described with reference to FIG. 1.

In addition, the laundry drying machine may include a drying unit, and the drying unit may include at least one of the driving motor, the drying fan, the temperature sensor, the first heater, or the second heater described with reference to FIG. 6. The drying unit may perform the function of drying the drying object.

In addition, the laundry drying machine 10 according to the embodiment of the present invention may include the configuration of the learning device 200 described with reference to FIG. 2 and perform the function of the learning device 200 described with reference to FIG. 2.

The term "laundry drying machine" can also be used interchangeably with the term "AI laundry drying machine."

Figure 7:
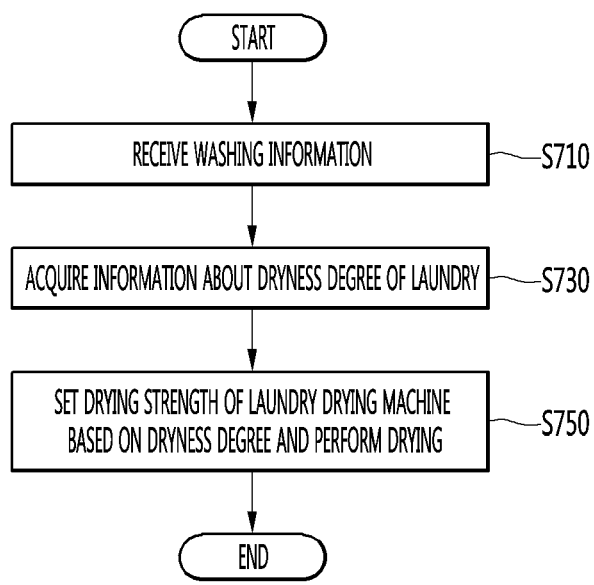
FIG. 7 is a diagram for describing a method for operating a laundry drying machine according to an embodiment of the present invention.

FIG. 7 is a diagram for describing a method for operating a laundry drying machine according to an embodiment of the present invention.

The method for operating the laundry drying machine according to the embodiment of the present invention may include: receiving washing information from the washing machine (S710); acquiring information about the dryness degree of the laundry by using the washing information (S730); and setting the drying strength of the laundry drying machine by using the information about the dryness degree and performing the drying (S750).

Operation of receiving the washing information from the washing machine (S710) will be described with reference to FIGS. 8 and 9.

FIGS. 8 and 9 are diagrams for describing the washing information according to an embodiment of the present invention.

The washing machine may refer to a laundry treatment apparatus having a function of managing laundry, such as water washing, dry cleaning, ironing, dust removal, drying, and sterilization.

In the present specification, objects including fabrics or textiles that can be washed, such as clothes, duvets, and dolls, are collectively referred to as laundry. In addition, laundry may refer to an object that is introduced into the washing machine.

In addition, the drying object in the present specification may refer to laundry that is introduced into the laundry drying machine as laundry whose washing is finished in the washing machine.

The processor 180 may receive washing information of the washing machine 800 from the washing machine 800.

In detail, the processor 180 may transmit/receive data by communicating with the washing machine through the communication unit. To this end, the communication unit may include a communication circuit configured to communicate with the washing machine.

If the washing is completed, the washing machine may transmit the washing information to the laundry drying machine.

Meanwhile, the washing information may be at least one of information about laundry introduced into the washing machine 800 or setting information of the washing machine 800.

In detail, the washing information may include at least one of a type of laundry, laundry weight before washing, water temperature, dehydration information, drying information, laundry loading ratio, or laundry weight after washing.

The type of laundry may be determined based on criteria for classifying laundry so as to set a washing mode. For example, if the washing mode includes cotton washing, duvet washing, and wool washing, the type of laundry may be cotton, duvet, and wool.

Meanwhile, the laundry weight before washing may refer to the weight before laundry introduced into the washing machine is washed.

In addition, the water temperature may refer to temperature information of water that is set for washing the laundry.

In addition, the dehydration information may refer to setting information set for dehydrating the laundry. For example, the dehydration information may include a dehydration strength. In addition, the dehydration strength may include at least one of dehydration strength or dehydration time.

In addition, the drying information may refer to setting information set for drying the laundry when the washing machine uses the drying function of the washing machine to dry the laundry. For example, the drying information may include a drying strength. The drying strength may also include at least one of drying strength or drying time.

The laundry loading ratio may refer to an actual input capacity relative to the drum storage capacity. For example, if the drum has a capacity of 20 kg and the laundry introduced into the drum is 10 kg, the laundry loading ratio may be 50%.

Meanwhile, the laundry weight after washing may refer to the weight of laundry whose washing is finished, and in particular, after all washing cycles such as washing, rinsing, dehydration, and drying are finished.

Next, the influence of each detail element of washing information on drying will be described.

The dryness degree of the drying object may be changed according to the type of laundry. For example, if the drying is performed at the same drying strength, the dryness degree of the cotton may be greater than the dryness degree of the duvet.

In addition, the dryness degree of the drying object may be changed according to the laundry weight before washing and the laundry weight after washing. In detail, that a value obtained by subtracting the laundry weight before washing from the laundry weight after washing is great may mean that the drying object contains a large amount of water. On the contrary, that a value obtained by subtracting the laundry weight before washing from the laundry weight after washing is small may mean that the drying object contains a small amount of water. If the drying is performed with the same drying strength, the dryness degree of the drying object containing a large amount of water may be lower than the dryness degree of the drying object containing a small amount of water.

In addition, the dryness degree of the drying object may be changed according to the water temperature during washing. For example, if the laundry washed at a high temperature during washing is introduced into the laundry drying machine while maintaining a high temperature, the drying may be performed quickly.

In addition, the dryness degree of the drying object may be changed according to the dehydration information. For example, since laundry dehydrated with high dehydration strength contains a small amount of water, the drying may be performed quickly when introduced into the laundry drying machine.

In addition, the dryness degree of the drying object may be changed according to the drying information of the washing machine. For example, since laundry dried with high drying strength in the washing machine contains a small amount of water, the drying may be performed quickly when introduced into the laundry drying machine.

In addition, the dryness degree of the drying object may be changed according to the laundry loading ratio of the washing machine. For example, as the laundry loading ratio is lower, the dehydration or drying efficiency is excellent. Therefore, if the dehydration or drying is performed in the washing machine, the laundry contains a smaller amount of water as the laundry loading ratio is lower. If the laundry containing a small amount of water is introduced into the laundry drying machine, the drying may be performed quickly.

Therefore, if pieces of such washing information are appropriately combined, the dryness degree of the drying object may be expected.

This will be described below with reference to FIG. 10.

Figures 10, 11, 12:
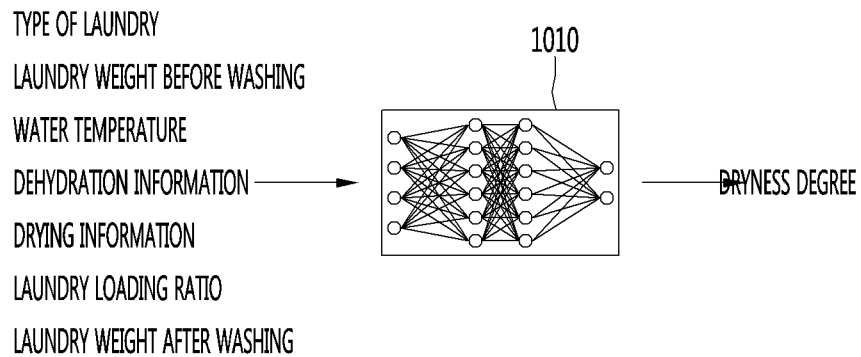
FIG. 10 is a diagram for describing a method for acquiring information about a dryness degree of a drying object using washing information, according to an embodiment of the present invention.
FIG. 11 is a diagram for describing a method for setting a drying strength according to an embodiment of the present invention.
FIG. 12 is a diagram for describing a method for setting a drying strength according to a drying mode, according to an embodiment of the present invention.

FIG. 10 is a diagram for describing a method for acquiring information about a dryness degree of a drying target using washing information, according to an embodiment of the present invention.

The dryness degree may be a value indicating how much the object is dried. As the dryness degree is higher, the water content of the object may be lower.

In addition, the dryness degree of the laundry may refer to the dryness degree of the laundry whose washing is finished in the washing machine.

Meanwhile, the washing machine may transmit the washing information to the washing machine if the washing of the laundry is completed.

Alternatively, if an operation command of the laundry drying machine is received from the user, the processor of the laundry drying machine may transmit a request for transmitting washing information to the washing machine. In this case, the washing machine may transmit the washing information to the laundry drying machine.

In addition, if the washing of the laundry is completed, the user may take out the laundry inside the washing machine and introduce the laundry into the laundry drying machine.

Therefore, the drying object of the laundry drying machine may refer to laundry that is introduced into the laundry drying machine as laundry whose washing is completed in the washing machine. The dryness degree of the drying object may refer to the dryness degree of laundry which is introduced into the laundry drying machine after washing is completed in the washing machine. In addition, the dryness degree of the laundry may be the same as the dryness degree of the drying object.

In this specification, the AI model may include a first AI model and a second AI model.

The processor may acquire the dryness degree of the drying object by using the first AI model.

The first AI model 1010 may be a neural network trained by using the washing information and the dryness degree labeled in the washing information.

In detail, the learning device 200 may train the neural network by labeling the dryness degree to the washing information. The washing information may be data collected by actually performing washing, and the dryness degree may also be the dryness degree of the laundry that is actually washed.

In more detail, the learning device 200 may train the neural network using washing information including at least one of type of laundry, laundry weight before washing, water temperature, dehydration information, drying information, laundry loading ratio, or laundry weight after washing, as an input value and the dryness degree of the laundry corresponding to the washing information as an output value. The dryness degree of the laundry may be a correct answer that the neural network should infer using the washing information.

Therefore, the learning device 200 may label the dryness degree of the laundry to the washing information and provide the same to the neural network.

In this case, the neural network may use the washing information and the dryness degree of the laundry to infer a function of a correlation between the washing information and the dryness degree of the laundry. In addition, parameters (weight, bias, etc.) of the neural network may be determined (optimized) through the evaluation of the function inferred in the neural network.

Meanwhile, the dryness degree may be expressed as a continuous value, instead of being classified into classes. Therefore, the neural network may be trained by using regression algorithms.

Meanwhile, the neural network trained in the above manner may be referred to as a first AI model 1010.

Meanwhile, the first AI model 1010 may be mounted on the laundry drying machine.

In detail, the first AI model 1010 may be implemented by hardware, software, or a combination of hardware and software. If all or part of the AI model is implemented by software, one or more instructions constituting the AI model may be stored in the memory 170 of the laundry drying machine.

Meanwhile, the processor may provide the washing information to the first AI model 1010 to acquire information about the dryness degree of the drying object.

In detail, the processor may input washing information to the first AI model 1010. If the washing information is input, the first AI model 1010 may output a result value (dryness degree of the drying object).

FIG. 11 is a diagram for describing a method for setting the drying strength according to an embodiment of the present invention.

The processor may control the drying unit to perform drying by using the information about the dryness degree.

In detail, the processor may set the drying strength of the laundry drying machine based on the dryness degree of the drying object, and perform drying based on the set drying strength.

The drying strength may be at least one of a drying time or a drying strength.

The drying time refers to a time for drying the drying object, and the drying time may increase as the drying time increases.

In addition, the drying strength refers to intensity (for example, the temperature of air) for drying the drying object. As the drying intensity increases, the drying strength may increase.

The memory may store a table in which the dryness degree and the drying strength of the drying object correspond to each other.

The processor may acquire the drying strength corresponding to the dryness degree of the drying object from the table, and perform the drying based on the acquired drying strength.

Meanwhile, the drying strength corresponding to the dryness degree may refer to a drying strength capable of minimizing the damage to the drying object while completing the drying of the drying object.

For example, the drying strength corresponding to the dryness degree may refer to a minimum strength (for example, minimum time or minimum intensity) for lowering the dryness degree of the drying object below a predetermined value (for example, 1%).

FIG. 12 is a diagram for describing a method for setting the drying strength according to a drying mode, according to an embodiment of the present invention.

The processor may set the drying mode of the laundry drying machine based on the type of laundry.

In detail, the washing machine may determine the type of laundry by using the input for setting the washing mode. For example, if an input for setting a duvet washing mode is received, the washing machine may determine the type of laundry as a duvet. As another example, if an input for setting a wool washing mode is received, the washing machine may determine the type of laundry as a wool.

The washing machine may transmit washing information including the type of laundry to the laundry drying machine.

Meanwhile, the processor may set the drying mode of the laundry drying machine based on the type of laundry. For example, if the type of laundry is a duvet, the processor may set the drying mode to the duvet drying mode. As another example, if the type of laundry is a wool, the processor may set the drying mode to the wool drying mode.

Meanwhile, the processor may set the drying strength in the set drying mode based on the dryness degree of the drying object.

In detail, the drying operation of the laundry drying machine in a first drying mode and the drying operation of the laundry drying machine in a second drying mode may be different from each other. Therefore, even if the drying strengths are the same, the dryness degree of the drying object that has been dried in the first drying mode and the dryness degree of the drying object that has been dried in the second drying mode may be different from each other.

Therefore, the processor may set the drying strength in the set drying mode based on the dryness degree of the drying object.

In detail, if the first drying mode is set for the drying object, the processor may acquire a first drying strength corresponding to the first drying mode.

In more detail, the memory may store a first table in which the dryness degree and the drying strength of the drying object in the first drying mode correspond to each other.

The processor may acquire, from the first table, the drying strength of the first drying mode corresponding to the dryness degree of the drying object. In addition, the processor may perform drying in the first drying mode according to the acquired drying strength.

In addition, if the second drying mode is set for the drying object, the processor may acquire a second drying strength corresponding to the second drying mode.

In detail, the memory may store a second table in which dryness degree and the drying strength of the drying object in the second drying mode correspond to each other.

The processor may acquire, from the second table, the drying strength of the second drying mode corresponding to the dryness degree of the drying object. In addition, the processor may perform drying in the second drying mode according to the acquired drying strength.

FIG. 13 is a diagram for describing a method for setting a drying strength by using a drying target loading ratio according to an embodiment of the present disclosure.

The laundry drying machine may include a sensor configured to acquire data related to a drying object loading ratio. For example, the laundry drying machine may include a weight sensor configured to detect the weight of the drying object introduced into the laundry drying machine.

Meanwhile, the drying object loading ratio may refer to an actual input capacity relative to the capacity of the drum. For example, if the drum has a capacity of 20 kg and the drying object introduced into the drum is 10 kg, the drying object loading ratio may be 50%.

Meanwhile, the dryness degree of the drying object after the drying is performed may be changed according to the drying object loading ratio of the laundry drying machine. For example, as the drying object loading ratio is lower, the drying efficiency is excellent. Therefore, if the drying is performed in the laundry drying machine, the dryness degree may be lower as the drying object loading ratio is lower.

Meanwhile, the processor may acquire the drying object loading ratio by using data related the drum's capacity and the drying object loading ratio.

The processor may also set the drying mode of the laundry drying machine based on the type of laundry.

The processor may also acquire the drying strength in the drying mode based on the dryness degree and the drying object loading ratio, and perform the drying in the drying mode based on the acquired drying strength.

In detail, if the first drying mode is set for the drying object, the processor may acquire a first drying strength corresponding to the first drying mode based on the drying object loading ratio.

In more detail, the memory may store a first table in which the "dryness degree and the drying object loading ratio" and the drying strength in the first drying mode correspond to each other.

The processor may acquire, from the first table, the drying strength of the first drying mode corresponding to the dryness degree of the drying object and the drying object loading ratio. In addition, the processor may perform drying in the first drying mode according to the acquired drying strength.

In addition, if the second drying mode is set for the drying object, the processor may acquire a second drying strength corresponding to the second drying mode based on the drying object loading ratio.

In detail, the memory may store a second table in which the "dryness degree and the drying object loading ratio" and the drying strength in the second drying mode correspond to each other.

The processor may acquire, from the second table, the drying strength of the second drying mode corresponding to the dryness degree of the drying object and the drying object loading ratio. In addition, the processor may perform drying in the second drying mode according to the acquired drying strength.

FIG. 14 is a diagram for describing a method for acquiring a drying strength of a drying target by using a second AI model according to an embodiment of the present invention.

In this specification, the AI model may include a first AI model and a second AI model.

The processor may acquire the drying strength of the drying object by using the second AI model.

The second AI model 1410 may be a neural network trained by using training data including a dryness degree of a drying object, a drying mode, and a drying object loading ratio, and a drying strength labeled to the training data.

In detail, the learning device 200 may train the neural network by labeling the drying strength to the training data including the dryness degree of the drying object, the drying mode, and the drying object loading ratio. The dryness degree of the drying object, the drying mode, and the drying object loading ratio may be data collected while actually performing the drying, and the drying strength may also be a set value set while actually performing the drying.

In addition, if training data is collected from a specific drying object, the drying strength, which is labeled to the training data, may be the minimum strength (e.g., at least one of minimum time or minimum strength) to reduce the dryness degree of the specific drying object to less than or equal to a predetermined value.

For example, it is assumed that there is training data including information indicating that the dryness degree of the drying object is 50%, the drying mode is the wool drying mode, and the drying object loading ratio is 80%. In this case, the drying strength, which is labeled to the training data, may be a drying strength at which the dryness degree after drying is a predetermined value (e.g., 1%) when the drying object having a dryness degree of 50% and a drying object loading ratio of 80% is dried in a wool drying mode.

Meanwhile, the learning device 200 may train the neural network using the training data including the dryness degree of the drying object, the drying mode, and the drying object loading ratio as an input value and the drying strength corresponding to the training data as an output value. The drying strength may be a correct answer that the neural network should infer using the dryness degree of the drying object, the drying mode, and the drying object loading ratio.

In this case, the neural network may use the draining data and the drying strength to infer a function of a correlation between the training data and the drying strength. In addition, parameters (weight, bias, etc.) of the neural network may be determined (optimized) through the evaluation of the function inferred in the neural network.

Meanwhile, the drying strength may be expressed as a continuous value, instead of being classified into a class. Therefore, the neural network may be trained using regression algorithms.

Meanwhile, the neural network trained in the above manner may be referred to as a second AI model 1410.

Meanwhile, the second AI model 1410 may be mounted on the laundry drying machine.

In detail, the second AI model 1410 may be implemented by hardware, software, or a combination of hardware and software. If all or part of the AI model is implemented by software, one or more instructions constituting the AI model may be stored in the memory 170 of the laundry drying machine.

Meanwhile, the processor may provide the dryness degree of the drying object, the drying mode, and the drying object loading ratio to a second AI model 1410 to acquire a drying strength in the drying mode.

In detail, the processor may input the dryness degree of the drying object, the drying mode, and the drying object loading ratio to the second AI model 1410. If the dryness degree the drying object, the drying mode, and the object loading ratio are input, the second AI model 1410 may output a result value (drying strength).

Meanwhile, the example in which the dryness degree of the drying object is acquired and the drying strength is acquired by using the acquired dryness degree has been described.

However, without acquiring the dryness degree, it is also possible to acquire a drying strength immediately.

This will be described below with reference to FIG. 15.

FIG. 15 is a diagram for describing a method for acquiring a drying strength of a drying target by using a third AI model according to an embodiment of the present invention.

The processor may acquire the drying strength of the drying object by using the third AI model.

The third AI model 1410 may be a neural network trained by using 'training data including washing information and a drying object loading ratio' and a drying strength labeled to the training data. The washing information may include at least one of a type of laundry, laundry weight before washing, water temperature, dehydration information, drying information, laundry loading rate, or laundry weight after washing.

The washing information and the drying object loading ratio may be data collected while actually performing washing and drying, and the drying strength may also be a set value set while actually performing drying.

In addition, if training data is collected from a specific laundry and a drying object corresponding to the specific laundry (the case where the specific laundry is introduced into the laundry drying machine), the drying strength, which is labeled to the training data, may be the minimum strength (e.g., at least one of minimum time or minimum strength) to reduce the dryness degree of the specific drying object to less than or equal to a predetermined value.

Meanwhile, the neural network trained in the above manner may be referred to as a third AI model. The third AI model 1410 may be mounted on the laundry drying machine.

Meanwhile, the processor may set the drying mode based on the type of laundry included in the washing information.

In addition, the processor may provide the washing information and the drying object loading ratio to the third AI model to acquire the drying strength.

The processor may perform drying according to the drying strength output by the third AI model in the drying mode.

The following describes how to retrain AI models by using a feedback.

After performing the drying, the processor may receive a feedback about the drying strength from the user.

For example, in a state where the drying operation is completed, the processor may receive a user input for performing additional drying. In addition, the user input for performing additional drying may mean that the dryness degree or the drying strength output by the AI model is incorrect.

In this case, the processor may train the AI model by using the feedback.

For example, it is assumed that the first AI model outputs a first dryness degree with respect to first washing information, and the processor performs drying by using the first dryness degree. If the user input for performing additional drying is received, the processor may retrain the first AI model by labeling a second dryness degree lower than the first dryness degree to the first washing information.

As another example, it is assumed that the second AI model outputs a first drying strength for a specific input value, and the processor performs drying by using the first drying strength. If the user input for performing additional drying is received, the processor may retrain the second AI model by labeling a second drying strength higher than the first drying strength to the specific input value.

Meanwhile, the processor may also train the AI model by using humidity information inside the drum.

Specifically, the humidity sensor may be installed inside the drum. After the drying is performed, the processor may acquire humidity information inside the drum by using data collected by the humidity sensor.

The processor may acquire the dryness degree of the drying object based on the humidity information. In this case, the processor may train the AI model by using the dryness degree of the drying object.

For example, it is assumed that the first AI model outputs a first dryness degree with respect to first washing information, and the processor performs drying by using the first dryness degree. If the dryness degree acquired based on the humidity information is lower than a predetermined value (a value determining that the drying is completed), the processor may retrain the first AI model by labeling a second dryness degree lower than the first dryness degree to the first laundry information. On the contrary, if the dryness degree acquired based on the humidity information is higher than the predetermined value (the value determining that the drying is completed), the processor may retrain the first AI model by labeling the second dryness degree higher than the first dryness degree to the first laundry information.

As another example, it is assumed that the second AI model outputs a first drying strength for a specific input value, and the processor performs drying by using the first drying strength. If the dryness degree acquired based on the humidity information is lower than the predetermined value (the value determining that the drying is completed), the processor may retrain the second AI model by labeling the second dryness degree higher than the first dryness degree to the specific input value. On the contrary, if the dryness degree acquired based on the humidity information is higher than the predetermined value (the value determining that the drying is completed), the processor may retrain the second AI model by labeling the second dryness degree lower than the first dryness degree to the specific input value.

A method for operating an AI laundry drying machine will be described below.

The method for operating the AI laundry drying machine according to the embodiment of the present invention may include: receiving washing information from the washing machine; acquiring information about the dryness degree of the drying object by using the washing information; and performing drying by using the information about the dryness degree.

In this case, the washing information may include at least one of a type of laundry, laundry weight before washing, water temperature, dehydration information, drying information, laundry loading rate, or laundry weight after washing.

In this case, the acquiring of the information about the dryness degree of the drying object includes providing the washing information to the first AI model to acquire the information about the dryness degree of the drying object. The first AI model may be a neural network trained by using the washing information and the dryness degree labeled to the washing information.

In this case, the performing of the drying by using the information about the dryness degree includes: setting a drying strength of the AI laundry drying machine based on the dryness degree; and performing drying based on the set drying strength. The drying strength may be at least one of the drying time or the drying strength.

Meanwhile, the performing of the drying by using the information about the dryness degree may include: setting a drying mode of the AI laundry drying machine based on a type of laundry; setting a drying strength in the drying mode based on the dryness degree; and performing drying in the drying mode according to the set drying strength.

Meanwhile, the performing of the drying by using the information about the dryness degree may include: acquiring data related to a drying object loading ratio; acquiring the drying object loading ratio based on the data; setting a drying mode of the AI laundry drying machine based on the type of laundry; acquiring a drying strength in the drying mode based on the dryness degree and the drying object loading ratio; and performing drying in the drying mode based on the acquired drying strength.

In this case, the acquiring of the drying strength in the drying mode based on the dryness degree and the drying object loading ratio may include providing the dryness degree, the drying mode, and the drying object loading ratio to the second AI model to acquire the dryness degree in the drying mode. The second AI model may be a neural network trained by using 'training data including a dryness degree, a drying mode, and a drying object loading ratio' and a drying strength labeled to the training data Meanwhile, the method for operating the AI laundry drying machine may further include: receiving a feedback about a drying strength from a user after performing the drying; and training the AI model by using the feedback.

As described above, according to the present invention, the dryness degree of the drying object is grasped, and the drying is performed at the minimum drying strength for lowering the dryness degree of the drying object to a predetermined value or less based on the dryness degree. Therefore, it is possible to minimize the damage to the fabric while completing the drying, and minimize the damage to the fabric.

In addition, according to the present invention, since the drying mode is set by using the type of laundry identified by the washing machine, the user does not need to separately set the drying mode.

In addition, according to the present invention, since the re-training is performed by using the feedback of the user, there is an advantage that can evolve the AI model.

The present invention may be embodied as computer-readable codes on a program-recorded medium. The computer-readable recording medium may be any recording medium that stores data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. The computer may also include the processor 180 of the terminal. Therefore, the above description is illustrative and should not be construed as limited in all aspects. The scope of the present invention should be determined by reasonable interpretation of the appended claims, and all changes within the equivalent scope of the present invention falls within the scope of the present invention.

What is claimed is:

1. An artificial intelligence laundry drying machine comprising:
   a communication circuit configured to receive, from a washing machine, washing information including at least one of a type of laundry, laundry weight before washing, water temperature, dehydration information, drying information, laundry loading ratio, or laundry weight after washing;
   a dryer configured to dry laundry;
   a humidity sensor configured to collect humidity information inside a drum of the dryer; and
   a processor configured to:
   provide the washing information to a first artificial intelligence model that is a neural network trained by using washing information and labeling a dryness degree to washing information,
   acquire information about a first dryness degree of the laundry from the first artificial intelligence model,
   provide the information about the first dryness degree of the laundry acquired from the first artificial intelligence model, a drying mode based on a type of the laundry, and the laundry loading ratio to a second artificial intelligence model to acquire a drying strength in the drying mode,
   set a drying strength of the artificial intelligence laundry drying machine,
   cause the dryer to perform drying based on the set drying strength,
   acquire the humidity information inside the drum using the humidity sensor after performing the drying,
   acquire a second dryness degree of the laundry based on the humidity information,
   retrain the first artificial intelligence model by labeling the acquired second dryness degree, wherein if the acquired second dryness degree is lower than a predetermined value, the first artificial intelligence model is retrained by labeling the acquired second dryness degree lower than the first dryness degree, and if the acquired second dryness degree is higher than the predetermined value, the first artificial intelligence model is retrained by labeling the acquired second dryness degree higher than the first dryness degree,
   retrain the second artificial intelligence model by labeling a second drying strength higher than the drying strength to a specific input value,
   receive a user input for performing additional drying, and
   retrain the first artificial intelligence model by labeling an additional dryness degree lower than the first dryness degree.

2. The artificial intelligence laundry drying machine according to claim 1,
   wherein the drying strength is at least one of a drying time or a drying intensity.

3. The artificial intelligence laundry drying machine according to claim 1, further comprising a memory configured to store a first table in which the first dryness degree and the drying strength of the laundry in a first drying mode correspond to each other, wherein the processor is further configured to:
   set the first drying mode of the artificial intelligence laundry drying machine based on a type of laundry;
   set the drying strength in the first drying mode based on the first dryness degree; and
   cause the dryer to perform drying in the first drying mode according to the set drying strength.

4. The artificial intelligence laundry drying machine according to claim 1, further comprising a sensor configured to acquire data related to a laundry loading ratio, and a memory configured to store a first table in which the first dryness degree, the laundry loading ratio, and the drying strength of the laundry in a first drying mode correspond to each other, wherein the processor is further configured to:
acquire the laundry loading ratio based on the data;
set the first drying mode of the artificial intelligence laundry drying machine based on a type of laundry;
acquire the drying strength in the first drying mode based on the first dryness degree and the laundry loading ratio; and
cause the dryer to perform drying in the first drying mode based on the acquired drying strength.

5. The artificial intelligence laundry drying machine according to claim 1, wherein the processor is further configured to:
receive feedback about the drying strength from a user after performing the drying; and
train the second artificial intelligence model by using the feedback.

6. The artificial intelligence laundry drying machine according to claim 1, wherein the second artificial intelligence model is trained using regression algorithms.

\* \* \* \* \*